June 8, 1948.  F. E. PAYNE  2,443,145
COUPLING
Filed Jan. 17, 1945

Inventor:
Frank E. Payne
By: Charles W. Vogtech
Atty.

Patented June 8, 1948

2,443,145

UNITED STATES PATENT OFFICE 2,443,145

COUPLING

Frank E. Payne, Glencoe, Ill., assignor to Crane Packing Company, Chicago, Ill., a corporation of Illinois Application January 17, 1945, Serial No. 573,162

3 Claims. (Cl. 285—90)

This invention relates to coupling for pipes, tubes, tubular chambers and the like, and particularly to such couplings which are required to have a certain degree of flexibility to absorb vibrations, both axial and radial.

There are many fluid systems in use which require the use of pipe or tube sections joined together by couplings, wherein the tubes are subjected to considerable vibration. This vibration in a rigid system soon loosens the couplings, or it may even result in crystallization and rupture of the tubes or couplings, thereby causing a failure of the system. Fluid lines in aircraft are particularly susceptible to such failures and hence it is important to provide some flexibility in the system since it is difficult to eliminate the vibrations.

There has been proposed a pipe coupling comprising an internally flanged nut threaded on one of the pipes to be coupled and surrounding the other of the pipes, with a flexible compressible packing intermediate the flange on the nut and the end of the first-mentioned pipe. When the nut is tightened the packing is compressed both axially and radially so that a seal is formed by the pressure of the packing on the outside of the other pipe. This pressure cannot be controlled accurately and in most instances is too great to give the desired degree of freedom or flexibility.

The principal object of this invention is to provide a coupling for tubes or the like which will effectively seal the contents of the tubes and yet provide a maximum of flexibility for the coupled tubes.

A specific object of this invention is to provide a packing for a tube coupling wherein the packing may be compressed against one of the tubes to any desired extent without exerting a corresponding pressure on the other tube to be coupled.

A still more specific object of this invention is to provide a packing for a tube coupling, the coupling having an internally flanged nut, and the packing comprising an endless band having an outer region adapted to be compressed between the flange and the end of one tube and an inner region which is hollowed to form a chamber in communication with the fluid under pressure in the tubes, the inner region being adapted to be compressed against the other tube by the fluid to form a seal between the packing and said other tube. It is also an object of this invention to form the inner region in such a manner that an abutment will be provided for the tube by the packing to prevent the tubes to be coupled from separating.

Figure 1:
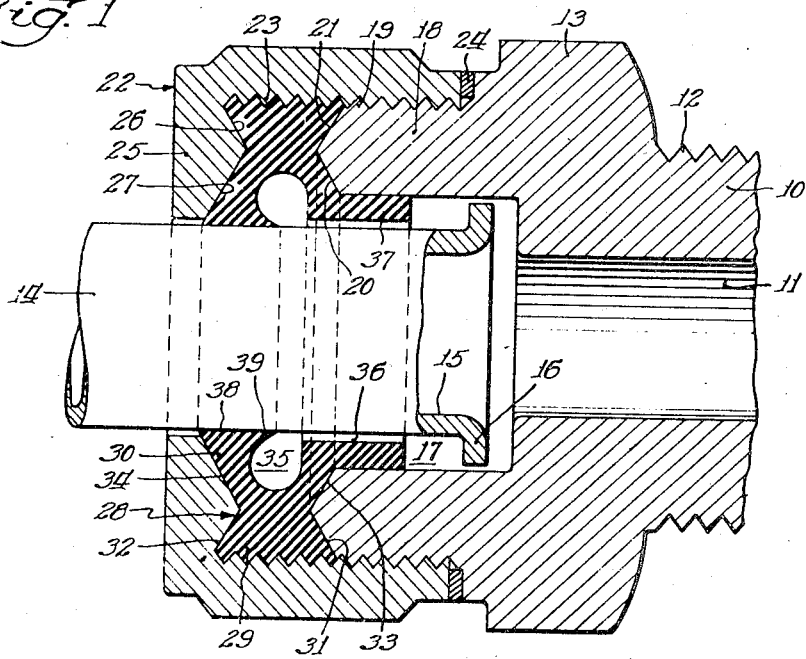
Figure 2:
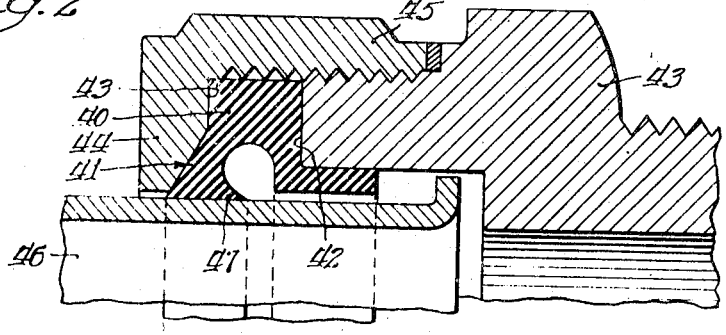

These and other objects and features of this invention will become apparent from the following detailed description when taken together with the accompanying drawing in which Fig. 1 is a section taken through a coupling employing the packing of this invention; and Fig. 2 is a corresponding section through a modified form of the packing.

Referring now in detail to Fig. 1, there is shown a coupling member or fitting 10 of a conduit or pipe having an interior passageway 11 through which fluid under pressure may be passed. Said coupling member is provided with external threads 12 which may be utilized to secure the coupling member 10 to a pipe, container or other receptacle for fluid. Passageway 11 is enlarged at 13 to receive telescopically the end of a pipe or conduit 14, said pipe having an internal bore 15 which approximates in size passageway 11 of coupling member 10. Said pipe 14 is formed with a flange 16 on the end thereof, the outside diameter of the flange being smaller by a considerable margin than the diameter of the enlarged bore 13 so as to permit pipe 14 to move freely relative to coupling member 10 in a plane perpendicular to the axes of the pipes. It will be noted that a considerable annular space 17 is formed between the exterior of pipe 14 and the interior of the enlarged passageway 13 and that this space is in hydraulic communication with bores 11 and 15.

The end 18 of the coupling member 10 is formed with threads 19 on the exterior thereof and with oppositely inclined conical faces 20 and 21. A nut 22 is adapted to be secured to end 18 of coupling member 10 through the cooperation between internal threads 23 on the nut and the threads 19 on said end 18. A gasket 24 is provided between the nut and coupling member 10 to form a fluid-tight seal therebetween. The left-hand end (Fig. 1) of nut 22 has a radially inwardly extending flange 25 which surrounds pipe 14 with a loose fit. The inner surface of flange 25 is formed with oppositely inclined conical surfaces 26 and 27, the diameter of intersection of conical surfaces 26 and 27 being substantially the same as the diameter of intersection of conical surfaces 21 and 20.

In the space formed by flange 25 and the end 18 of coupling member 10 is located a packing ring 28 of resilient compressible material such as rubber or the like. Said ring 28 has an outer portion 29 which fits into the space formed by conical surfaces 21 and 26 and an inner portion 30 fitting into the space formed by conical surfaces 20 and 27. Thus the outer portion 29 has oppositely disposed conical surfaces 31 and 32 and the inner portion 30 has oppositely disposed conical surfaces 33 and 34. The inner region is hollowed out as at 35 to form an annular chamber. This chamber is in communication with the aforementioned chamber 17 by means of a passageway 36 which is bounded on the inside by the periphery of pipe 14 and on the outside by a laterally extending flange 37 formed as an integral part of the inner portion 30. Thus chamber 35 causes the inner region 30 to assume the form of a pair of diverging ribs, one of which is in contact with end 18 of coupling member 10 and the other of which is in contact with flange 25. There is contact also between the inner portion 30 and the exterior of pipe 14 at 38, chamber 35 being so designed as to result in a tapered lip 39 on the inside of the rib in contact with pipe 14 and flange 25.

When assembled, packing ring 25 is compressed between flange 25 and the end 18 in a manner to form a fluid-tight seal between said end and flange through the compression of the outer portion 29 between these two members. Due to the converging conical surfaces 26 and 21, the greater portion of pressure will be applied in a direction to move the material of the packing ring radially outwardly so that the pressure exerted by the tightening nut will not be transmitted to pipe 14 and thus restrict its free movement relative to coupling member 10. The seal between the packing member 28 and the exterior of pipe 14 is formed almost entirely by the pressure of the fluid in chamber 25 acting radially inwardly on lip 29 to compress the lip upon the exterior surface of pipe 14. This pressure also serves to spread the inner portion 30 against the conical surfaces 29 and 27 so that some sealing effect is produced at these points, although the greatest portion of course takes place through the compression of the outer region 29.

Since there may be a tendency for pipe 14 to withdraw from the coupling due to excessive vibration, strain or other causes, flange 37 is made of such diameter as to extend into the path of movement of flange 16, thereby preventing such withdrawal of pipe 14 from its cooperating coupling member 10. It is contemplated that flange 37 will have sufficient rigidity to resist any separating forces which might be imposed upon pipe 14. Any excessive fluid pressures will of course tend to make the seal tighter and hence will not cause the coupling to leak. Since, however, it is primarily the fluid pressure which forms the seal between the packing and the exterior of pipe 14, there will be less resistance between the movement of pipe 14 than would be the case were the pressure supplied solely through the action of the tightening nut 22. This reduces the strain on the packing material and on the coupling as a whole since the pipe 14 will yield more readily in response to vibrations in any given plane.

In assembling the coupling, the packing 28 may be slipped over pipe 14 from either end. Since chamber 35 has an outside diameter which is greater than the outside diameter of flange 16, the rib in contact with the flange 25 may be distorted sufficiently to pass over flange 16 without causing any serious damage to the packing. Similarly, the rib terminating in flange 37 may likewise be distorted sufficiently to pass over flange 16. After the packing is in place to the left of flange 16 as viewed in Fig. 1, the pipe 14 and assembled packing are brought into contact with the end 18 of coupling member 10 and the nut 22 is then turned on threads 19 until packing 28 is compressed the desired amount. It is understood of course that the nut will be slipped over end 14 from the left since the opening provided in flange 25 for pipe 14 is not sufficiently large to accommodate flange 16.

The modification shown in Fig. 2 differs from the form shown in Fig. 1 only in that the outer region 40 of packing 41 is made with sides that are perpendicular to the axis of the packing instead of conical. Thus the end face 42 of the coupling member 43 is simply squared off as is also the surface 43 of flange 44 on nut 45. Such a construction is somewhat less expensive to make and the molds from which the packing 41 are formed are likewise less expensive in their first cost. In other respects the packing 41 is similar to packing 28 and a fluid-tight joint is formed between the packing and the exterior of pipe end 46 by the action of fluid pressure upon a lip 47 which bears against the outside of pipe 46 and substantially no part of the compressive force exerted by nut 45 is transmitted through the packing material to the pipe 46. Thus the same degree of freedom is provided for the pipe coupling of Fig. 2 as is found in the coupling of Fig. 1.

It is understood that the foregoing description is merely illustrative of the preferred embodiments of this invention and that the scope of the invention is not to be limited thereto, but is to be determined by the appended claims.

What is claimed is:

1. As an article of manufacture, a packing for sealing the juncture between a pair of relatively movable pipes, one of which is telescoped over another, and both of which are adapted to contain fluid under pressure, said packing comprising a band of compressible material surrounding the telescoped pipe and having an outer region adapted to be clamped in sealing engagement to the telescoping pipe, and an inner region comprising a pair of diverging ribs, one of which is formed with a thin edge pressed in fluid-tight contact with the telescoped pipe by the pressure of the fluid and the other of which extends interiorly of the telescoping pipe to form an abutment for limiting the outward movement of the telescoped pipe relative to the telescoping pipe.

2. As an article of manufacture, a packing for sealing the juncture between a pair of relatively movable pipes, one of which is formed with a flared end which is telescoped within the other, and both of which are adapted to contain fluid under pressure, said packing comprising a band of compressible material surrounding the telescoped pipe and spaced from the flared end thereof, said band having an outer region adapted to be clamped in sealing engagement to the telescoping pipe, and an inner region comprising a pair of diverging ribs, one of which is formed with a thin edge pressed in fluid-tight contact with the telescoped pipe by the pressure of the fluid and the other of which extends interiorly of the telescoping pipe toward the flared end of the telescoped pipe to act as an abutment therefor to limit the outward movement of the telescoped pipe relative to the telescoping pipe.

3. In combination, a pipe coupling for connecting two relatively movable pipe sections, at least one of which is adapted to hold fluid under pressure, and a packing for the coupling to prevent loss of fluid therefrom, said coupling comprising an open-ended fitting adapted to be secured to one pipe section and receiving within said open end the end of the other pipe section, the end of said other pipe section being flared outwardly, a nut threaded on the fitting and having a flange extending radially inwardly to a diameter which is less than the diameter of the flared end of the said other pipe section, the end of the fitting and the flange on the nut defining between them an opening which in radial cross-section is narrower at the central region than at the inner and outer regions thereof, the packing in the outer region when under compression being urged radially outward and exerting no pressure upon the pipe, and the packing in the inner region being formed with inwardly diverging ribs, one rib contacting the periphery of the pipe and having a thin lip formed thereon and the other rib contacting the opening in the fitting and extending into the path of movement of the flared end of the said other pipe section, the space between the ribs being subjected to fluid pressure to effect a fluid-tight seal between the lip and pipe contacted thereby.

FRANK E. PAYNE.

REFERENCES CITED

The following references are of record in the file of this patent:

UNITED STATES PATENTS

| Number | Name | Date |
| --- | --- | --- |
| 1,683,076 | Johnson | Sept. 4, 1928 |
| 2,190,419 | Evarts | Feb. 13, 1940 |
| 2,372,095 | Leistensnider | Mar. 20, 1945 |